(12) United States Patent
Yu et al.

(10) Patent No.: US 11,843,826 B2
(45) Date of Patent: Dec. 12, 2023

(54) METHOD FOR DETECTING BLACK BAR INCLUDED IN VIDEO CONTENT, AND ELECTRONIC DEVICE THEREFOR

(71) Applicant: Samsung Electronics Co., Ltd., Gyeonggi-do (KR)

(72) Inventors: Seungjin Yu, Gyeonggi-do (KR); Hansang Kim, Gyeonggi-do (KR); Sungryul Bae, Gyeonggi-do (KR); Jungwon Lee, Gyeonggi-do (KR); Chaejung Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 631 days.

(21) Appl. No.: 16/979,939

(22) PCT Filed: Mar. 13, 2019

(86) PCT No.: PCT/KR2019/002902
§ 371 (c)(1),
(2) Date: Sep. 11, 2020

(87) PCT Pub. No.: WO2019/177369
PCT Pub. Date: Sep. 19, 2019

(65) Prior Publication Data
US 2021/0058671 A1 Feb. 25, 2021

(30) Foreign Application Priority Data

Mar. 16, 2018 (KR) .......................... 10-2018-0030907

(51) Int. Cl.
*H04N 21/4402* (2011.01)
*H04N 21/44* (2011.01)
(Continued)

(52) U.S. Cl.
CPC ............... *H04N 21/440272* (2013.01); *H04N 21/44008* (2013.01); *H04N 21/47205* (2013.01); *H04N 21/4858* (2013.01)

(58) Field of Classification Search
CPC .......... H04N 21/4312; H04N 21/4356; H04N 21/44008; H04N 21/440263;
(Continued)

(56) References Cited

U.S. PATENT DOCUMENTS 5,411,493 A * 5/1995 Rodriguez ................ A61F 7/02
604/290
6,423,047 B1 * 7/2002 Webster ................ A61F 13/505
604/397
(Continued)

FOREIGN PATENT DOCUMENTS

EP 1855468 A2 11/2007
KR 10-2009-0070945 A 7/2009
(Continued)

OTHER PUBLICATIONS

European Search Report dated Aug. 2, 2021.
(Continued)

*Primary Examiner* — Michael B. Pierorazio
(74) *Attorney, Agent, or Firm* — Cha & Reiter, LLC

(57) ABSTRACT

Various embodiments of the present invention relate to a device and a method for detecting a black bar in video content in an electronic device. An electronic device comprises a display device, a processor, and a memory automatically connected with the processor, wherein the memory, when executed, can store instructions for allowing the processor to: play video content on the basis of a request relating to the playing of the video content; acquire, on the basis of the request relating to the playing of the video content, time information relating to the detection period of
(Continued)

a black bar included in the video content; detect, on the basis of the time information, the black bar by using at least one image frame of the video content included in the detection period, when the detection period arrives while the video content is played; and adjust, on the basis of the black bar included in the video content and the resolution of the display device, the size of an image area of the video content being played. Other embodiments are also possible.

10 Claims, 10 Drawing Sheets

(51) Int. Cl.
*H04N 21/472* (2011.01)
*H04N 21/485* (2011.01)

(58) Field of Classification Search
CPC ..... H04N 21/440272; H04N 21/47205; H04N 21/47217; H04N 21/4858; H04N 5/185
See application file for complete search history.

(56) References Cited

U.S. PATENT DOCUMENTS

| | | | | |
|---|---|---|---|---|
| 6,982,780 B2* | 1/2006 | Morley | ............ | H04N 21/41415 352/38 |
| 8,249,388 B2* | 8/2012 | Xu | ............ | G11B 27/34 382/282 |
| 8,483,393 B2* | 7/2013 | Robert | ............ | H04N 21/63345 380/278 |
| 8,547,481 B2* | 10/2013 | Look | ............ | H04N 21/42653 348/625 |
| 8,817,188 B2* | 8/2014 | Yang | ............ | G11B 27/034 348/556 |
| 2002/0121273 A1* | 9/2002 | Nyilas | ............ | A41D 13/1245 128/99.1 |
| 2004/0088737 A1* | 5/2004 | Donlan | ............ | H04N 7/165 725/135 |
| 2007/0294710 A1* | 12/2007 | Meesseman | ............ | H04L 41/22 719/328 |
| 2007/0294734 A1* | 12/2007 | Arsenault | ............ | H04N 21/25875 725/87 |
| 2007/0296866 A1* | 12/2007 | Fujisawa | ............ | H04N 7/0122 348/E5.062 |
| 2008/0114880 A1* | 5/2008 | Jogand-Coulomb | ... | H04L 61/30 709/227 |
| 2008/0143876 A1* | 6/2008 | Kouramanis | ............ | H04N 5/04 348/553 |
| 2008/0163295 A1* | 7/2008 | Watabe | ............ | H04N 21/4884 348/739 |
| 2008/0194276 A1* | 8/2008 | Lin | ............ | H04L 61/5014 455/466 |
| 2008/0270462 A1* | 10/2008 | Thomsen | ............ | G06F 16/2471 |
| 2009/0133090 A1* | 5/2009 | Busse | ............ | H04N 21/4755 725/132 |
| 2010/0021512 A1* | 1/2010 | Arron | ............ | A61L 15/46 424/404 |
| 2010/0043046 A1* | 2/2010 | Sen | ............ | H04N 21/4622 725/133 |
| 2010/0134633 A1* | 6/2010 | Engeli | ............ | H04N 7/0122 348/180 |
| 2010/0138297 A1* | 6/2010 | Fitzgerald | ............ | G06Q 30/0255 715/764 |
| 2010/0138298 A1* | 6/2010 | Fitzgerald | ............ | H04L 63/10 705/14.58 |
| 2010/0299264 A1* | 11/2010 | Berger | ............ | G06Q 30/0601 705/59 |
| 2012/0019722 A1* | 1/2012 | Kwisthout | ............ | H04N 5/445 348/580 |
| 2013/0091519 A1* | 4/2013 | Mclauchlan | ............ | G06Q 30/0601 725/32 |
| 2013/0100349 A1* | 4/2013 | Look | ............ | H04N 5/44 348/558 |
| 2013/0175333 A1* | 7/2013 | Gilbert | ............ | H04N 21/41407 235/375 |
| 2014/0150013 A1* | 5/2014 | Fauqueur | ............ | H04N 21/8455 725/32 |
| 2014/0196094 A1* | 7/2014 | Singh | ............ | H04N 21/482 725/56 |
| 2014/0373041 A1* | 12/2014 | Yan | ............ | H04N 21/4627 725/27 |
| 2015/0074703 A1* | 3/2015 | Cremer | ............ | H04N 21/44222 725/19 |
| 2015/0124888 A1* | 5/2015 | Hwang | ............ | H04N 21/6336 375/240.26 |
| 2016/0234522 A1* | 8/2016 | Lu | ............ | H04N 19/85 |
| 2016/0381401 A1* | 12/2016 | Katsavounidis | ............ | H04N 21/81 725/116 |
| 2017/0180789 A1* | 6/2017 | Wright | ............ | H04N 21/47202 |
| 2020/0084486 A1* | 3/2020 | Cho | ............ | G06F 21/335 |

FOREIGN PATENT DOCUMENTS

| | | |
|---|---|---|
| KR | 10-1328934 B1 | 11/2013 |
| KR | 10-1372639 B1 | 3/2014 |
| KR | 10-1431806 B1 | 8/2014 |
| KR | 10-2015-0083427 A | 7/2015 |
| WO | 2008/155601 A1 | 12/2008 |

OTHER PUBLICATIONS

Notice of Final Rejection dated Jul. 27, 2022.
Indian Search Report dated Nov. 30, 2021.
Korean Search Report dated Feb. 11, 2022.
Notice Of Patent Grant dated Nov. 22, 2022.
Uropean Search Report dated Nov. 3, 2020.
Summon to attend Oral Proceedings dated Mar. 7, 2023.

* cited by examiner

METHOD FOR DETECTING BLACK BAR INCLUDED IN VIDEO CONTENT, AND ELECTRONIC DEVICE THEREFOR

CROSS REFERENCE TO RELATED APPLICATIONS

This application is a National Phase Entry of PCT International Application No. PCT/KR2019/002902, which was filed on Mar. 13, 2019, and claims a priority to Korean Patent Application No. 10-2018-0030907, which was filed on Mar. 16, 2018, the contents of which are incorporated herein by reference.

TECHNICAL FIELD

Various embodiments of the disclosure relate to an apparatus and a method for detecting a black bar included in a video content in an electronic device.

BACKGROUND ART

With the development of information and communications technology and semiconductor technology, various kinds of electronic devices are developing into multimedia devices providing various multimedia services. For example, the multimedia services may include at least one of a voice communication service, a message service, a broadcasting service, a wireless Internet service, a camera service, an electronic payment service or a music playing service. An electronic device may provide a media playing service for playing a video content needed by a user. For example, the video content may be stored in a memory of the electronic device or may be received from an external electronic device for a streaming service.

DISCLOSURE OF INVENTION

Technical Problem

A video content may include a black bar on an upper/lower portion or a left/right portion of an image to overcome a difference between an aspect ratio of the image and an aspect ratio of an electronic device. For example, a video content created with an aspect ratio of 21:9 may have a black bar inserted into an upper/lower portion of an image in order to overcome a difference in the aspect ratio from an electronic device having an aspect ratio of 16:9. The black bar may be referred to as a letter box or a pillar box.

However, when the video content into which the black bar is inserted is played, the electronic device outputs the black bar on a display device along with the image, and thus may interrupt a user watching the video content.

Various embodiments of the disclosure may provide an apparatus and a method for detecting a black bar included in a video content in an electronic device.

Solution to Problem

According to various embodiments of the disclosure, an electronic device may include: display device; a processor; and a memory operatively connected with the processor, and the memory may store instructions that, when executed, cause the processor to: play a video content based on a request related to playing of the video content; based on the request related to the playing of the video content, acquire time information related to a detection period of a black bar included in the video content; when the detection period arrives while the video content is being played based on the time information, detect the black bar by using at least one image frame of the video content included in the detection period; and, based on the black bar included in the video content and a resolution of the display device, adjust a size of an image area of the video content being played.

According to various embodiments of the disclosure, an electronic device may include a display having a designated resolution, and a processor, and the processor may be configured to: play a video content based on a request related to playing of the video content including an image area and a black bar; based at least on the request, identify time information related to a period for detecting the black bar included in the video content; when the period corresponding to the time information is played while the video content is being played, detect the black bar by using at least one image frame included in the period; adjust a size of the image area from which the black bar is removed, based on the designated resolution; and provide the image area the size of which is adjusted through the display.

According to various embodiments of the disclosure, an electronic device may include a display having a designated resolution, and a processor, and the processor may be configured to: play a video content, based on a request related to playing of the video content including an image area and a black bar; based at least on the request, identify time information related to a period for detecting the black bar included in the video content; when the period corresponding to the time information is played while the video content is being played, detect the image area by using at least one image frame included in the period; adjust a size of the image area based on the designated resolution; and provide the display area the size of which is adjusted through the display.

According to various embodiments of the disclosure, an electronic device may include: a display having a designated resolution; a playing module to play a video content, based on a request related to playing of the video content including an image area and a black bar; an identification module to identify time information related to a period for detecting the black bar included in the video content, based at least on the request; a detection module to detect the black bar by using at least one image frame included in the period when the period corresponding to the time information is played while the video content is being played; an adjustment module to adjust a size of the image area from which the black bar is removed, based on the designated resolution; and a provision module to provide the image area the size of which is adjusted through the display.

Advantageous Effects of Invention

The electronic device and the operating method therefor according to various embodiments control detection of a black bar included in a video content through an application for playing the video content, such that accuracy of detection of the black bar can be enhanced while power consumption caused by detection of the black bar is reduced.

The electronic device and the operating method therefor according to various embodiments detect a black bar included in a video content through a detection period of the black bar that is determined by an application for playing the video content, such that a size of an image included in the video content can be adjusted to correspond to an aspect ratio of the electronic device.

BEST MODE FOR CARRYING OUT THE INVENTION

Various embodiments of the present disclosure are described below in detail with reference to the accompanying drawings. And, in describing an embodiment of the present disclosure, related well-known functions or constructions are not described in detail since they would obscure the gist of the present disclosure in unnecessary detail. And, the terms described below, which are terms defined considering functions of the present disclosure, may be modified according to user and operator's intention or practice, etc. Therefore, the definition should be given on the basis of the content throughout the present specification.

Figure 1:
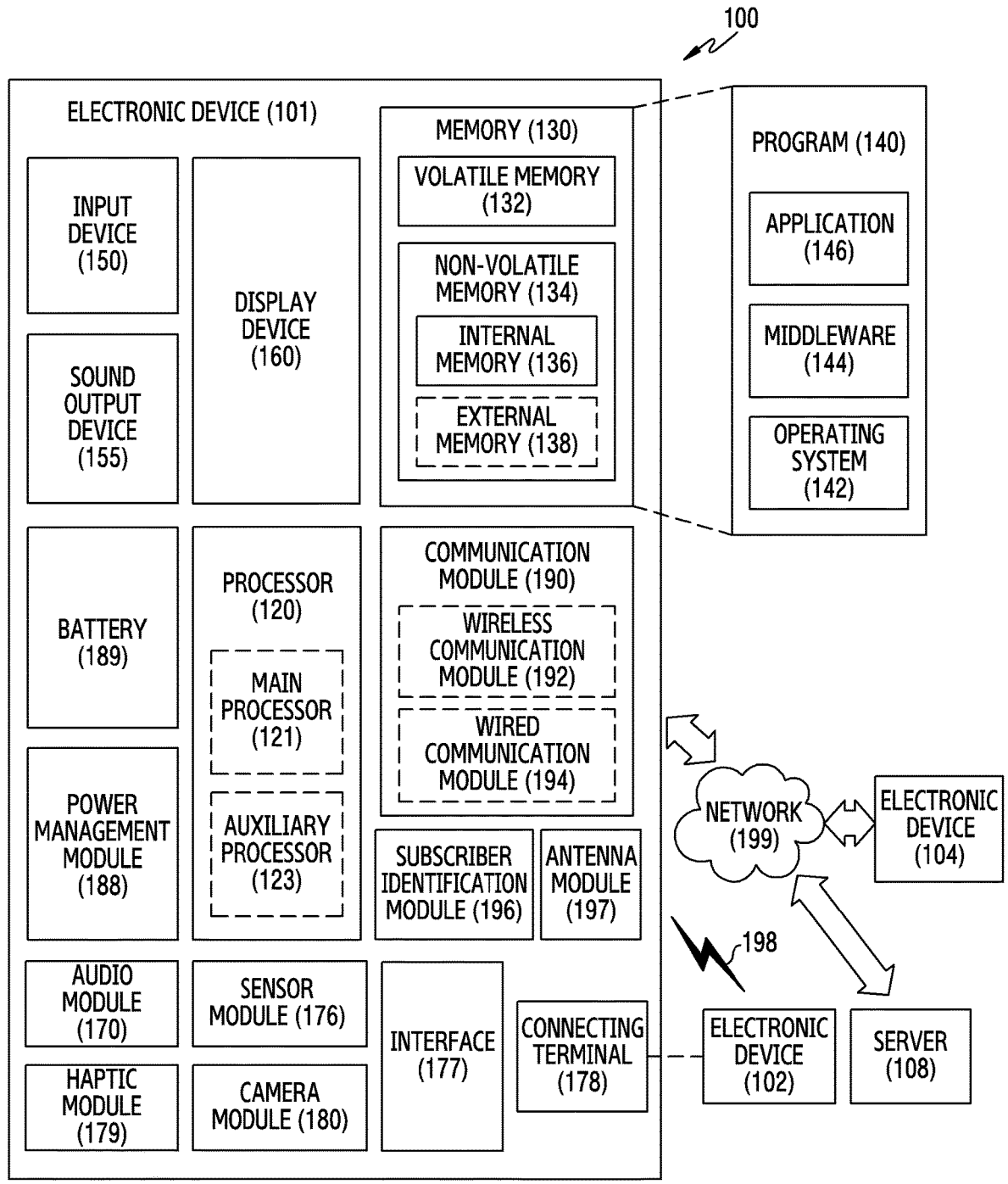
FIG. 1 is a block diagram of an electronic device for detecting a black bar included in a video content in a network environment according to various embodiments of the disclosure.

FIG. 1 is a block diagram of an electronic device 101 for detecting a black bar included in a video content in a network environment 100 according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, using subscriber information stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, the processor 120 may play a video content. For example, the processor 120 may play a video content stored in the memory 130 by using an application for playing the video content. For example, the processor 120 may play a video content received from an external electronic device (for example, the electronic device 102, the electronic device 104, or the server 108) by using the application for playing the video content. For example, the processor 120 may render an image frame of the video content to correspond to a size of the display device 160, and may output the image frame through the display device 160. The image frame may include a black bar and an image area.

According to an embodiment, the processor 120 may acquire time information of a period for detecting a black bar included in a video content. For example, when an event for playing a video content occurs, the processor 120 may acquire start offset information and duration information of a detection period related to an application for playing the video content. For example, the processor 120 may receive the start offset information and the duration information of the period for detecting the black bar from the application 146. The start offset of the detection period may be set based on at least one of identification information of the application for playing the video content or a type of another content (for example, an advertisement) which is played before the video content. The duration of the detection period may be set based on at least one of a characteristic (for example, a video playing method) of the application for playing the video content, state information (for example, a remaining capacity of a battery) of the electronic device 101, whether there exists a subtitle file related to the video content, or quality of the video content. For example, the event for playing the video content may occur based on an execution input of the application for playing the video content or a selection input of the video content to be played through the application.

According to an embodiment, when the start offset of the detection period of the black bar arrives while the video content is being played, the processor 120 may detect a black bar included in the video content. For example, the processor 120 may determine whether the start offset of the detection period of the black bar arrives, by using a timer which operates at the same time as playing the video content. For example, the processor 120 may determine whether the start offset of the detection period of the black bar arrives, by identifying a time stamp of an image frame forming the video content. For example, the processor 120 may identify a distribution of black pixels in at least one image frame included in the detection period. When black pixels are densely concentrated on an upper end, a lower end, a left side, or a right side of the video content, the processor 120 may determine the area where the black pixels are densely concentrated as the black bar. When pixels included in at least one continuous line (horizontal line or vertical line) in the image frame are all black, the processor 120 may determine that black pixels are densely concentrated on the corresponding line.

According to an embodiment, when the black bar is detected in the video content, the processor 120 may adjust a size of an image area included in the video content, based on the black bar. For example, the processor 120 may extract the image area except for the black bar from the video content. The processor 120 may render the image area to correspond to the size of the display device 160, and may output the image area through the display device 160. For example, the processor 120 may render at least a portion corresponding to the image area in the video content to correspond to the size of the display device 160, and may output the portion through the display device 160. For example, the image area may be a remaining area except for the black bar in the image frame of the video content, and may indicate an area including an image to be reproduced in the electronic device 101.

According to an embodiment, when an event for detecting a black bar occurs while a video content is being played, the processor 120 may detect a black bar in the video content. For example, when an aspect ratio of an image frame is changed while the video content is being played, the processor 120 may determine that the event for detecting the black bar occurs. For example, when a black bar detection request signal is received from an application for playing a video content, the processor 120 may determine that the event for detecting the black bar occurs. For example, when a channel for receiving a content for a streaming service from an external electronic device is changed or aspect ratio information of a video content received from the external electronic device is changed, the application may cause the black bar detection request signal to occur.

Figure 2:
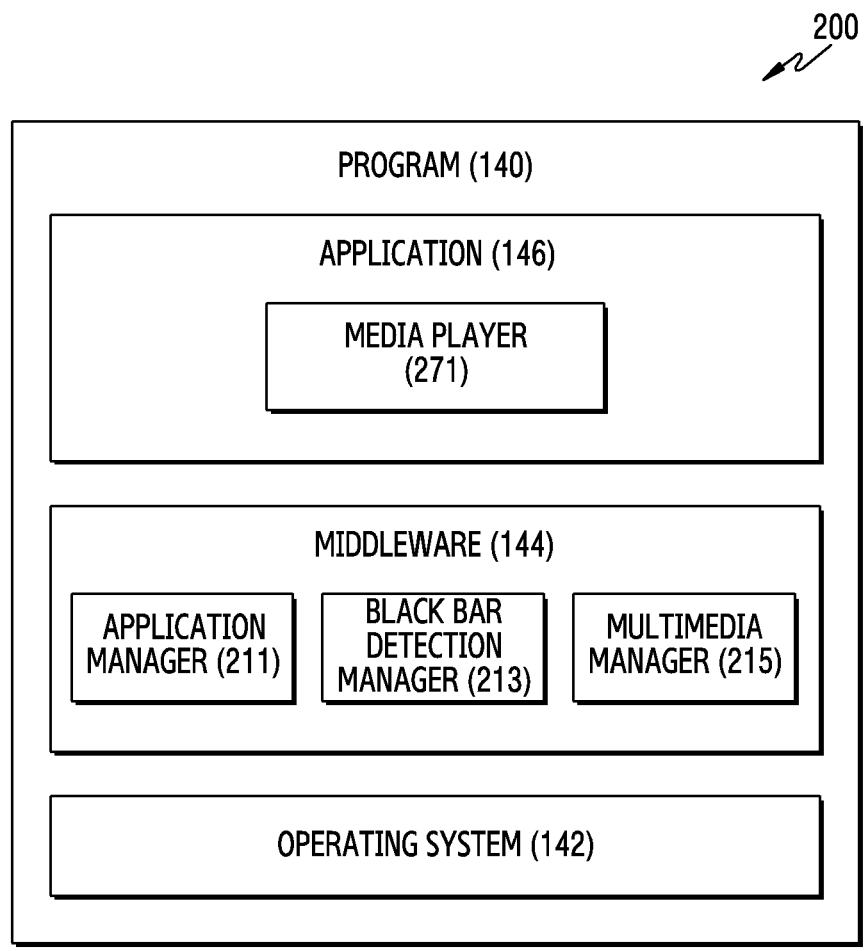
FIG. 2 is a block diagram of a program for detecting a black bar included in a video content in an electronic device according to various embodiments of the disclosure.

FIG. 2 is a block diagram 200 of a program for detecting a black bar included in a video content in an electronic device according to various embodiments of the disclosure. In the following description, the electronic device may include the electronic device 101 of FIG. 1 or at least a portion of the electronic device 101. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bath™. At least part of the program 140, for example, may be pre-loaded on the electronic device 101 during manufacture, or may be downloaded from or updated by an external electronic device (e.g., the electronic device 102 or 104, or the server 108) during use by a user.

According to an embodiment, the application 146 may include at least one media player application 271. For example, the media player application 271 may control a multimedia manager 215 to play a video content, based on an execution input of the media player application 271 or a selection input of the video content. In addition, when an event for playing a video content occurs, the media player application 271 may set start offset and duration information of a detection period related to the media player application 271. The media player application 271 may control a black bar detection manager 213 to detect a black bar of the video content which is played based on the start offset and duration information of the detection period. For example, the media player application 271 may identify start offset information of the detection period corresponding to the media player application 271 from a database stored in the memory 130. For example, the media player application 271 may identify start offset information of a detection period corresponding to another content (for example, an advertisement) which is played before the video content, from the database corresponding to the media player application 271 that is stored in the memory 130. For example, the media player application 271 may set the duration of the detection period based on at least one of a video playing method (for example, service quality) of the media player application 271, a remaining capacity of the electronic device 101, whether there exist subtitles related to the video content, or playing quality of the video content.

According to an embodiment, the middleware 144 may provide various functions to the application 146, such that a function or information provided from one or more resources of the electronic device 101 is used by the application 146. For example, the middleware 144 may include an application manager 211, the black bar detection manager 213, and the multimedia manager 215. For example, the application manager 211 may transmit a control command of the application 146 (for example, the media player application 271) to another manager (the black bar detection manager 213 or the multimedia manager 215). The application manager 211 may transmit a result of processing by another manager (the black bar detection manager 213 or the multimedia manager 215) to the application 146 (for example, the media player application 271). The multimedia manager 215, for example, may identify one or more formats to be used to play media files, and may encode or decode a corresponding one of the media files using a codec appropriate for a corresponding format selected from the one or more formats. For example, when a video playing command is received from the application manager 211, the multimedia manager 215 may decode the video content. For example, the black bar detection manager 213 may parse an image frame provided from the multimedia manager 215 and may detect a black bar included in the image frame. For example, when a black bar detection request command is received from the application manager 211, the black bar detection manager 213 may transmit the black bar detection request command to the multimedia manager 215 and may acquire a decoded image frame. The black bar detection manager 213 may parse the decoded image frame and may detect the black bar.

According to an embodiment, when black bar information included in the video content is received through the application manager 211, the media player application 271 may adjust a size of an image area included in the video content, based on the black bar.

According to an embodiment, when an event for detecting a black bar occurs while a video content is being played, the media player application 271 may control the black bar detection manager 215 to detect a black bar in the video content. For example, when a channel for receiving a content for a streaming service from an external electronic device (for example, the electronic device 102, the electronic device 104, or the server 108) is changed, or aspect ratio information of a video content provided from the external electronic device is changed, the media player application 271 may determine that the event for detecting the black bar occurs while the video content is being played. For example, when aspect ratio change information of an image frame is received through the application manager 211, the media player application 271 may determine that the event for detecting the black bar occurs while the video content is being played. For example, the aspect ratio change of the image frame may be identified by the multimedia manager 215 which decodes the image frame.

The OS 142 may control management (e.g., allocating or deallocation) of one or more system resources (e.g., process, memory, or power source) of the electronic device 101.

According to various embodiments of the disclosure, an electronic device (for example, the electronic device 101) may include: a display device (for example, the display device 160); a processor (for example, the processor 120); and a memory (for example, the memory 130) operatively connected with the processor, and the memory may store instructions that, when executed, cause the processor to: play a video content based on a request related to playing of the video content; based on the request related to the playing of the video content, acquire time information related to a detection period of a black bar included in the video content; when the detection period arrives while the video content is being played based on the time information, detect the black bar by using at least one image frame of the video content included in the detection period; and, based on the black bar included in the video content and a resolution of the display device, adjust a size of an image area of the video content being played.

According to various embodiments, the instructions may cause the processor to acquire a start offset and a duration of the detection period of the black bar included in the video content, based on the request related to the playing of the video content.

According to various embodiments, the start offset of the detection period of the black bar may be set based on at least one of an application for playing the video content or a type of another content that is played through the application before the video content.

According to various embodiments, the duration of the detection period of the black bar may be set based on at least one of an application for playing the video content, state information of the electronic device, whether there exists a subtitle file related to the video content, or quality of the video content.

According to various embodiments, the instructions may cause the processor to: identify whether the start offset of the detection period arrives while the video content is being played, based on a timer related to the playing of the video content or time stamp information included in an image frame of the video content; and, when the start offset of the detection period arrives, detect the black bar by using at least one image frame of the video content included in the duration of the detection period.

According to various embodiments, the instructions may cause the processor to: identify the image area included in the video content, based on the black bar included in the video content; and, based on the resolution of the display device, render the image area of the video content being played.

According to various embodiments, the instructions may cause the processor to: when an aspect ratio of an image frame is changed while the video content is being played, detect the black bar by using at least one image frame of the video content; and, based on the black bar included in the video content and the resolution of the display device, adjust the size of the image area of the video content being played.

According to various embodiments, the instructions may cause the processor to: when a channel for receiving a content from an external electronic device is changed while the video content is being played, detect the black bar by using at least one image frame of the video content included in the detection period; and, based on the black bar included in the video content and the resolution of the display device, adjust the size of the video area of the video content being played.

According to various embodiments, the video content may be stored in the memory or may be received from an external electronic device.

According to various embodiments of the disclosure, an electronic device (for example, the electronic device 101) may include a display (for example, the display device 160) having a designated resolution, and a processor (for example, the processor 120), and the processor may be configured to: play a video content based on a request related to playing of the video content including an image area and a black bar; based at least on the request, identify time information related to a period for detecting the black bar included in the video content; when the period corresponding to the time information is played while the video content is being played, detect the black bar by using at least one image frame included in the period; adjust a size of the image area from which the black bar is removed, based on the designated resolution; and provide the image area the size of which is adjusted through the display.

According to various embodiments, the processor may be configured to identify a start offset and a duration of the period for detecting the black bar, as at least a portion of the time information related to the period for detecting the black bar.

According to various embodiments, the processor may be configured to set the start offset of the period for detecting the black bar, based on at least one of an application for playing the video content or a type of another content that is played through the application before the video content.

According to various embodiments, the processor may be configured to set the duration of the period for detecting the black bar, based on at least one of the application for plying the video content, state information of the electronic device, whether there exists a subtitle file related to the video content, or quality of the video content.

According to various embodiments, the processor may be configured to identify whether the start offset of the period for detecting the black bar arrives while the video content is being played, based on a timer related to playing of the video content or time stamp information included in the image frame of the video content, and, when the start offset of the period for detecting the black bar arrives, to detect the black bar by using at least one image frame of the video content included in the duration of the period for detecting the black bar.

According to various embodiments, the processor may be configured to identify an image area included in the video content, based on the black bar included in the video content, and to render the image area of the video content which is being played, based on the resolution of the display device.

According to various embodiments of the disclosure, an electronic device (for example, the electronic device 101) may include a display (for example, the display device 160) having a designated resolution, and a processor (for example, the processor 120), and the processor may be configured to: play a video content, based on a request related to playing of the video content including an image area and a black bar; based at least on the request, identify time information related to a period for detecting the black bar included in the video content; when the period corresponding to the time information is played while the video content is being played, detect the image area by using at least one image frame included in the period; adjust a size of the image area based on the designated resolution; and provide the display area the size of which is adjusted through the display.

According to various embodiment, the processor may be configured to identify a start offset and a duration of the period for detecting the black bar, as at least a portion of the time information related to the period for detecting the black bar.

According to various embodiments, the processor may be configured to determine whether the start offset of the period for detecting the black bar arrives while the video content is being played, based on a timer related to playing of the video content or time stamp information included in the image frame of the video content, and, when the start offset of the period for detecting the black bar arrives, to detect the black bar by using at least one image frame of the video content included in the duration of the period for detecting the black bar.

According to various embodiments of the disclosure, an electronic device (for example, the electronic device 101) may include: a display (for example, the display device 160) having a designated resolution; a playing module to play a video content, based on a request related to playing of the video content including an image area and a black bar; an identification module to identify time information related to a period for detecting the black bar included in the video content, based at least on the request; a detection module to detect the black bar by using at least one image frame included in the period when the period corresponding to the time information is played while the video content is being played; an adjustment module to adjust a size of the image area from which the black bar is removed, based on the designated resolution; and a provision module to provide the image area the size of which is adjusted through the display.

According to various embodiments, the time information related to the period for detecting the black bar may include a start offset and a duration of the period for detecting the black bar.

Figure 3:
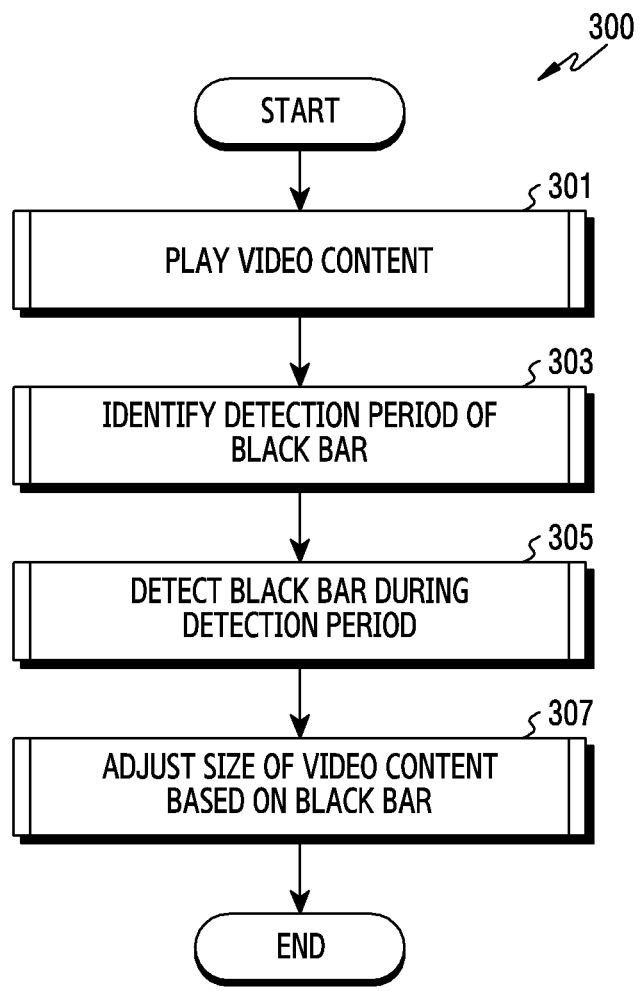
FIG. 3 is a flowchart for adjusting a size of a video content based on a black bar in an electronic device according to various embodiments of the disclosure.
Figure 4:
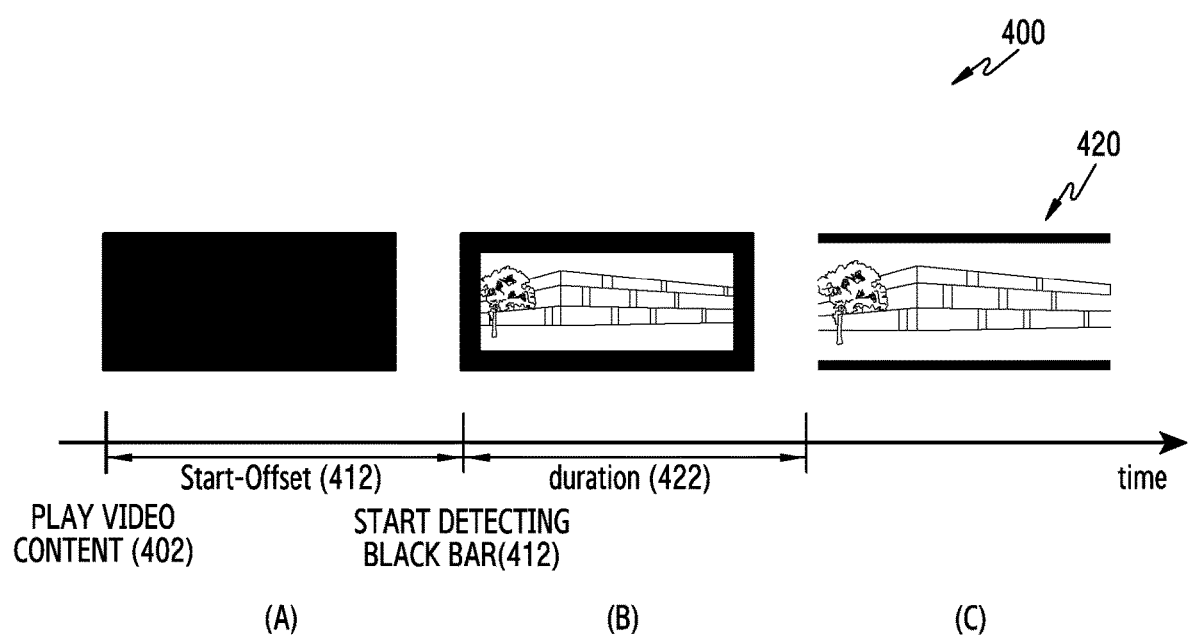
FIG. 4 is a view of a screen for adjusting a size of a video content based on a black bar according to various embodiments of the disclosure.

FIG. 3 is a flowchart 300 for adjusting a size of a video content based on a black bar in an electronic device according to various embodiments of the disclosure. FIG. 4 is a view of a screen 400 for adjusting a size of a video content based on a black bar according to various embodiments of the disclosure. In the following description, the electronic device may include the electronic device 101 of FIG. 1 or at least a portion (for example, the processor 120) of the electronic device 101.

Referring to FIG. 3, in operation 301, the electronic device (for example, the processor 120) may play a video content. For example, when an execution input of an application (or an application program) for playing a video content is received, the processor 120 may play the video content by using the application corresponding to the execution input. For example, when the execution input of the application for playing the video content is received, the processor 120 may control the display device 160 to display a video content list which is executable through the application corresponding to the execution input. When a selection input of the video content is received, the processor 120 may play the video content corresponding to the selection input. For example, the video content may be stored in the memory 130 of the electronic device 101 or may be received from an external electronic device (for example, the electronic device 102, the electronic device 104, the server 108) in real time.

In operation 303, the electronic device may identify time information of a period for detecting a black bar of the video content related to the application for playing the video content. For example, when an event for playing the video content occurs, the processor 120 may acquire time information related to the period for detecting the black bar of the video content. The time information related to the black bar detection period of the video content may include a start offset and a duration of the detection period, and may be set by the application for playing the video content.

In operation 305, the electronic device may detect the black bar included in the video content during the period for detecting the black bar of the video content while the video content is being played. For example, when the event for playing the video content occurs as shown in view (a) of FIG. 4 (402), the processor 120 may play the video content. When a start offset of the detection period arrives while the video content is being played as shown in view (b) of FIG. 4 (412), the processor 120 may parse at least one image frame included in a duration 414 of the detection period, and may detect the black bar included in the video content. The processor 120 may determine whether the start offset of the detection period arrives by using a timer operating at the time when the event for playing the video content occurs (or at the time when the video content is played), or a time stamp of the image frame. For example, the processor 120 may detect the black bar included in the video content, based on a distribution and positions of black pixels included in the image frame.

In operation 307, the electronic device may adjust a size of the video content which is being played, based on the black bar included in the video content. For example, the processor 120 may identify an image area included in the video content, based on the black bar of the video content.

The processor 120 may adjust the size of the image area included in the video content being played, based on a size (for example, a resolution) of the display device 160. For example, the processor 120 may adjust the size of the image area, such that at least one of a left/right length or a top/bottom length of the image area included in the video content matches the size of the display device 160. The display device 160 may display the image area 420 the size of which is adjusted as shown in view (c) of FIG. 4.

According to various embodiments of the disclosure, the electronic device may detect the image area included in the video content, by parsing at least one image frame included in the detection period.

Figure 5:
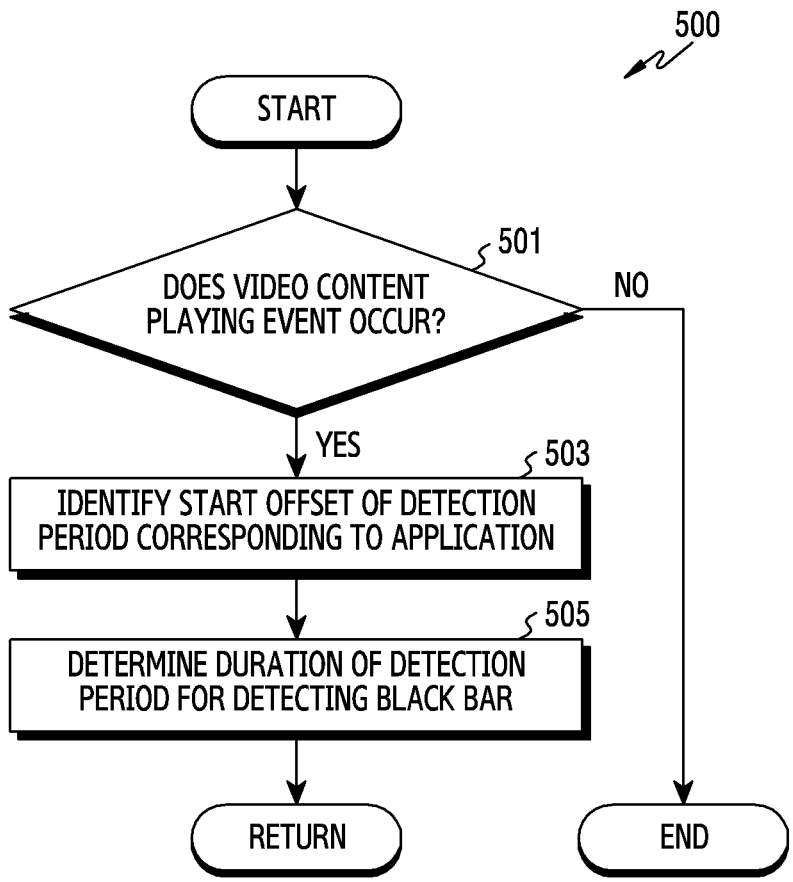
FIG. 5 is a flowchart for setting a detection period of a black bar in an electronic device according to various embodiments of the disclosure.

FIG. 5 is a flowchart 500 for setting a detection period of a black bar in an electronic device according to various embodiments of the disclosure. The following description may be about an operation of identifying a detection period of a black bar in operations 301 to 303 of FIG. 3. In the following description, the electronic device may include the electronic device 101 of FIG. 1 or at least a portion (for example, the processor 120) of the electronic device 101.

Referring to FIG. 5, in operation 501, the electronic device (for example, the processor 120) may determine whether an event for playing a video content occurs. For example, when an execution input of an application for playing a video content or a selection input of the video content is received, the processor 120 may determine that the event for playing the video content occurs.

When the event for playing the video content occurs ("Yes" in operation 501), the electronic device may identify a start offset of a detection period of a black bar, based on the application for playing the video content in operation 503. For example, the processor 120 may acquire start offset information of the detection period of the black bar from the application for playing the video content. For example, the start offset of the detection period of the black bar may be detected based on at least one of identification information of the application in a database stored in the memory 130 or a type of another content (for example, an advertisement) which is played before the video content. For example, the start offset of the detection period of the black bar may be detected based on a type of another content (for example, an advertisement) which is played before the video content in a database corresponding to the application that is stored in the memory 130. The start offset of the detection period of the black bar may be determined based on a duration during which another content (for example, an advertisement) is played before the video content is played in the application for playing the video content.

In operation 505, the electronic device may determine a duration related to the detection period of the black bar, based on the application for playing the video content. For example, the processor 120 may acquire duration information of the detection period of the black bar from the application for playing the video content. The duration of the detection period of the black bar may be set based on at least one of a video playing method (for example, service quality) of the application, a remaining capacity of a battery of the electronic device 101, whether there exist subtitles related to the video content, or quality of the video content. For example, the duration of the detection period of the black bar may be set to be relatively longer as the quality of the video content played through the application increases. For example, the duration of the detection period of the black bar may be set to be relatively shorter as the remaining capacity of the battery of the electronic device 101 is lower. For example, the duration of the detection period of the black bar may be set to be relatively long when there exist subtitles related to the video content.

According to various embodiments of the disclosure, the electronic device may play the video content in parallel with the operation of identifying time information related to the detection period of the black bar. For example, when the event for playing the video content occurs, the processor 120 may perform the operation of identifying time information related to the detection period of the black bar by using the application for playing the video, in parallel with the operation of playing the video content.

According to various embodiments of the disclosure, when the time information related to the detection period of the black bar is identified, the electronic device may play the video content. For example, when the event for playing the video content occurs, the processor 120 may identify the time information related to the detection period of the black bar through the application for playing the video. The processor 120 may play the video content corresponding to the event for playing the video content after identifying the time information related to the detection period of the black bar.

According to various embodiments of the disclosure, the electronic device may update the database stored in the memory 130, based on a result of detecting the black bar (for example, a failure to detect).

Figure 6:
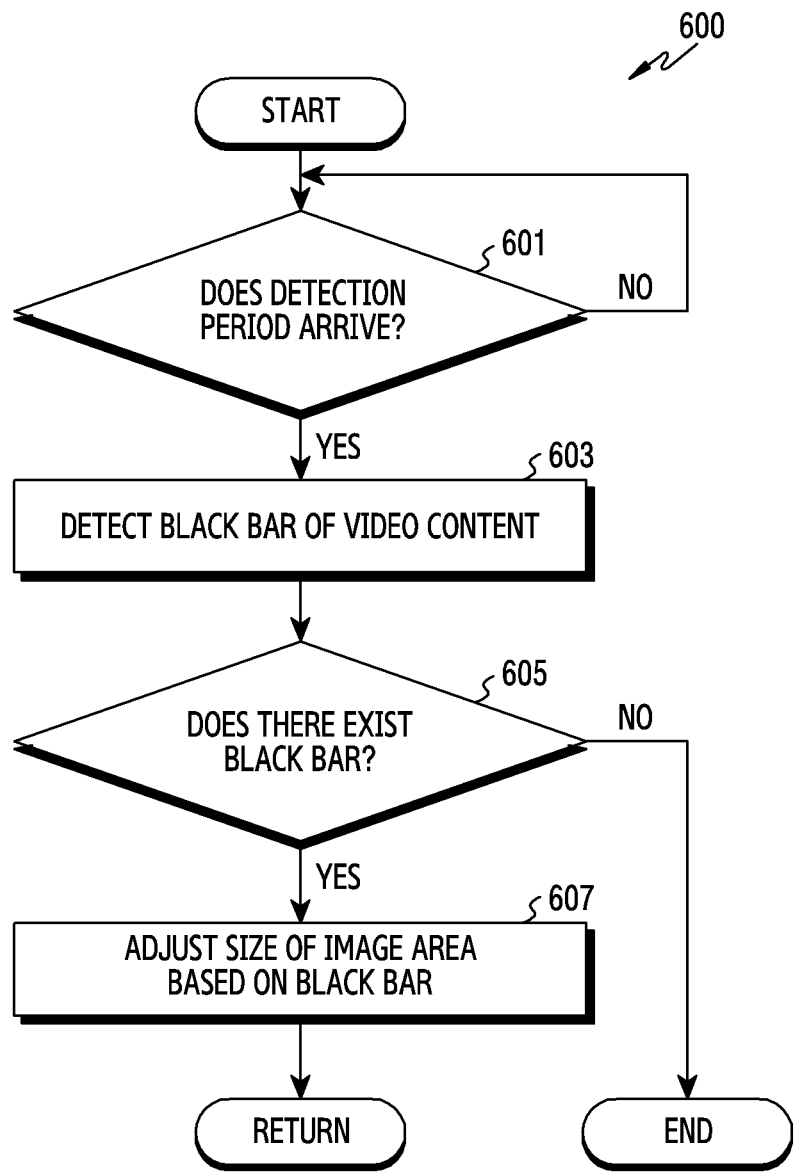
FIG. 6 is a flowchart for detecting a black bar in a video content in an electronic device according to various embodiments of the disclosure.

FIG. 6 is a flowchart 600 for detecting a black bar in a video content in an electronic device according to various embodiments of the disclosure. The following description may be about an operation of detecting a black bar included in a video content in operations 305 to 307 of FIG. 3. In the following description, the electronic device may include the electronic device 101 of FIG. 1 or at least a portion (for example, the processor 120) of the electronic device 101.

Referring to FIG. 6, in operation 601, when time information related to a period for detecting a black bar is identified (for example, operation 303 of FIG. 3), the electronic device (for example, the processor 120) may determine whether a detection period arrives in operation 601. For example, the processor 120 may determine whether a time offset of the detection period of the black bar arrives by using a timer for identifying a playing time of the video. For example, the timer may be activated at the time when an event for playing a video content occurs or at the time when the video content is played. For example, the processor 120 may determine whether the start offset of the detection period of the black bar arrives through a time stamp included in an image frame.

When the period for detecting the black bar (detection period) does not arrive ("No" in operation 601), the electronic device may identify whether the period for detecting the black bar arrives in operation 601.

When the period for detecting the black bar (detection period) arrives ("Yes" in operation 601), the electronic device may detect the black bar of the video content during a duration of the period for detecting the black bar in operation 603. For example, the processor 120 may identify a distribution of black pixels by parsing all or at least some of the pixels of at least one image frame included in the duration of the detection period. When black pixels are densely concentrated on a border of the video content, the processor 120 may determine the area where the black pixels are densely concentrated as a black bar. For example, the area where the black pixels are densely concentrated may include at least one continuous line (horizontal line or vertical line) in which all pixels are black in the image frame.

In operation 605, the electronic device may determine whether there exists the black bar included in the video content. For example, the processor 120 may determine whether there exists the black bar detected in operation 603.

When there exists the black bar included in the video content ("Yes" in operation 605), the electronic device may adjust a size of an image area included in the video content, based on the black bar in operation 607. For example, the processor 120 may extract the image area included in the video content based on the black bar. The processor 120 may render the image area extracted from the video content to correspond to a size of the display device 160. For example, the processor 120 may render at least a portion corresponding to the image area in the video content. The display device 160 may display the rendered image area. For example, the image area may include a remaining area except for the black bar in the video content.

According to various embodiments of the disclosure, when there exist subtitles related to the video content, the electronic device may adjust the size of the image area included in the video content, based on the black bar detected in the video content and a subtitle display area.

Figure 7:
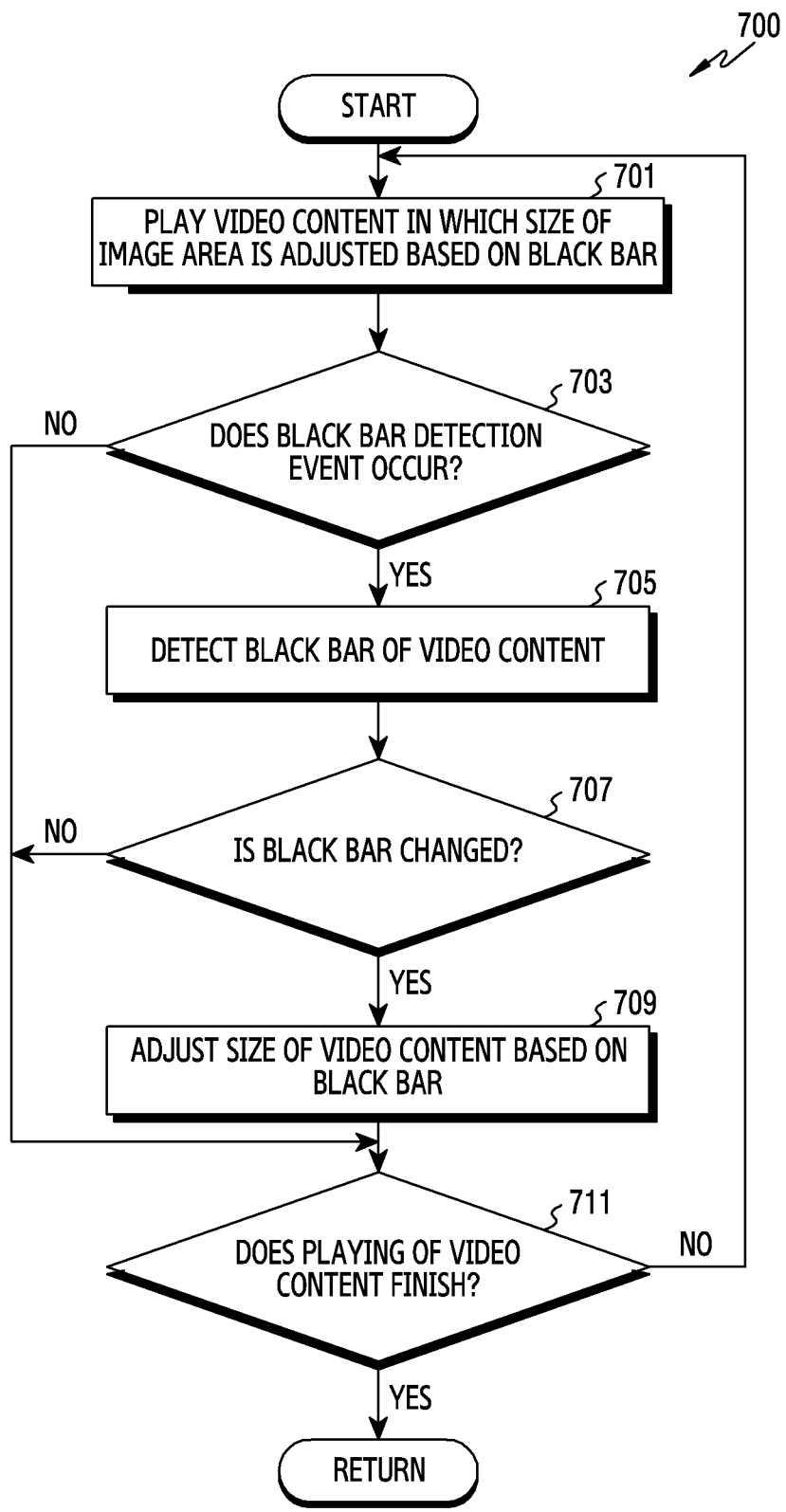
FIG. 7 is a flowchart for detecting a black bar while a video is played in an electronic device according to various embodiments of the disclosure.
Figure 8:
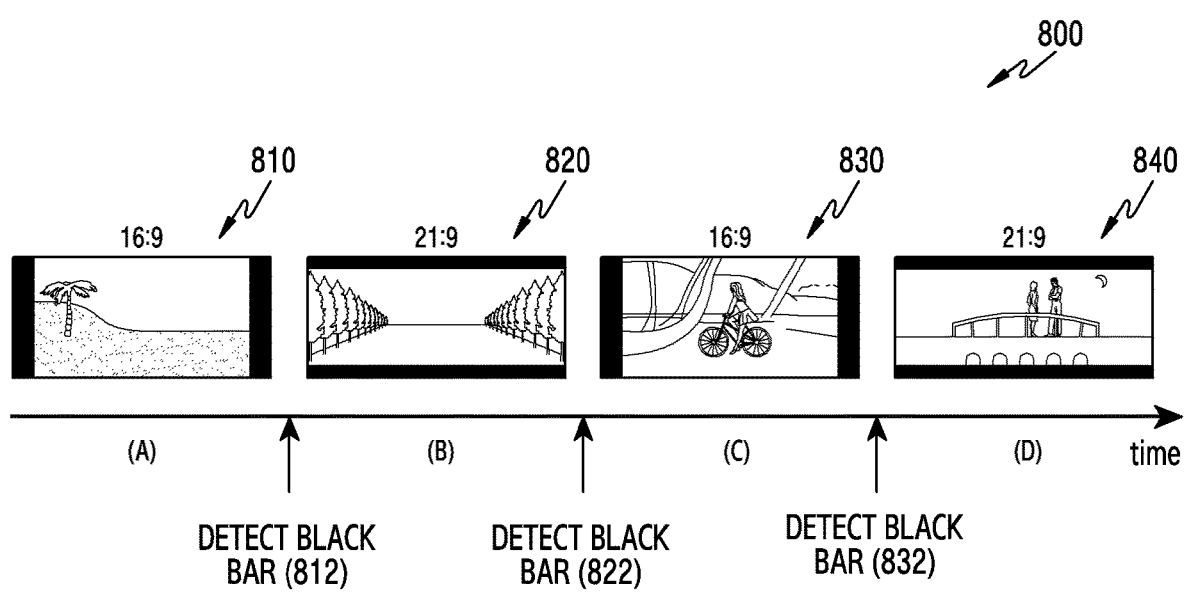
FIG. 8 is a view of a screen for detecting a black bar according to various embodiments of the disclosure.

FIG. 7 is a flowchart 700 for detecting a black bar while a video is being played in an electronic device according to various embodiments of the disclosure. FIG. 8 is a view of a screen 800 for detecting a black bar according to various embodiments of the disclosure. The following description may be about an operation of adjusting a size of a video content in operation 307 of FIG. 3. In the following description, the electronic device may include the electronic device 101 of FIG. 1 or at least a portion (for example, the processor 120) of the electronic device 101.

Referring to FIG. 7, when a black bar included in a video content is detected (for example, operation 305 of FIG. 3), the electronic device (for example, the processor 120) may adjust a size of an image area included in the video content based on the black bar of the video content, and may output the image area in operation 701. For example, the processor 120 may control the display device 160 to output the video content in which the size of the image area is adjusted based on the black bar included in the video content as shown in view (a) of FIG. 8 (810).

In operation 703, the electronic device may determine whether a black bar detection event occurs while the video content is being played. For example, when an aspect ratio of an image frame is changed (for example, from 16:9 to 21:9) while the video content is being played as shown in view (b) of FIG. 8 (812), the processor 120 may determine that the black bar detection event occurs.

When the black bar detection event occurs ("Yes" in operation 703), the electronic device may detect a black bar included in the video content in operation 705. For example, the processor 120 may detect the black bar included in the video content, based on a distribution and positions of black pixels in the image frame which is played during a duration of a period for detecting the black bar (detection period). For example, time information (for example, a start offset or duration) related to the period for detecting the black bar (detection period) may be set based on occurrence of the black bar detection event.

In operation 707, the electronic device may determine whether at least one of a size or a position of the black bar included in the video content is changed. For example, the processor 120 may determine whether at least one of the size or position of the black bar included in the video content is changed, by comparing sizes and positions of the black bar before and after the black bar detection event occurs.

When at least one of the size or position of the black bar included in the video content is changed ("Yes" in operation 707), the electronic device may adjust the size of the video content based on the black bar included in the video content in operation 709. For example, as shown in view (b) of FIG. 8, the processor 120 may adjust the size of the image area included in the video content based on the black bar detected in the video content (820).

When the size and the position of the black bar included in the video content are the same ("No" in operation 707) or the size of the video content is adjusted (operation 709), the electronic device may determine whether the playing of the video content finishes in operation 711. For example, the processor 120 may determine whether a finish input related to the application for playing the video content is received. For example, the processor 120 may determine whether the entire video content is played.

When the playing of the video content does not finish, the electronic device may adjust the size of the image area included in the video content, based on the black bar of the video content, and may output the image area in operation 701. For example, when the aspect ratio of the image frame is changed (for example, from 21:9 to 16:9) while the video content is being displayed, as shown in view (c) of FIG. 8 (822), the processor 10 may detect a black bar included in the video content. The processor 120 may adjust the size of the image area included in the video content, based on the black bar detected in the video content, as shown in view (c) of FIG. 8 (830). When the aspect ratio of the image frame is changed again (for example, from 16:9 to 21:9) while the video content is being displayed, as shown in view (d) of FIG. 8 (832), the processor 120 may detect a black bar included in the video content and may adjust the size of the image area included in the video content (840).

According to various embodiments of the disclosure, the electronic device may maintain the size of the image area adjusted based on the black bar, or may restore the size of the image area adjusted based on the black bar, while the black bar is detected based on the black bar detection event.

According to various embodiments, the electronic device may detect the black bar in the video content, based on a black bar detection request signal generated by the application for playing the video content, while the video content is being played. For example, the application for playing the video content may generate the black bar detection request signal when a channel for receiving a content for a streaming service from an external electronic device is changed or aspect ratio information of a video content provided from the external electronic device is changed.

Figure 9:
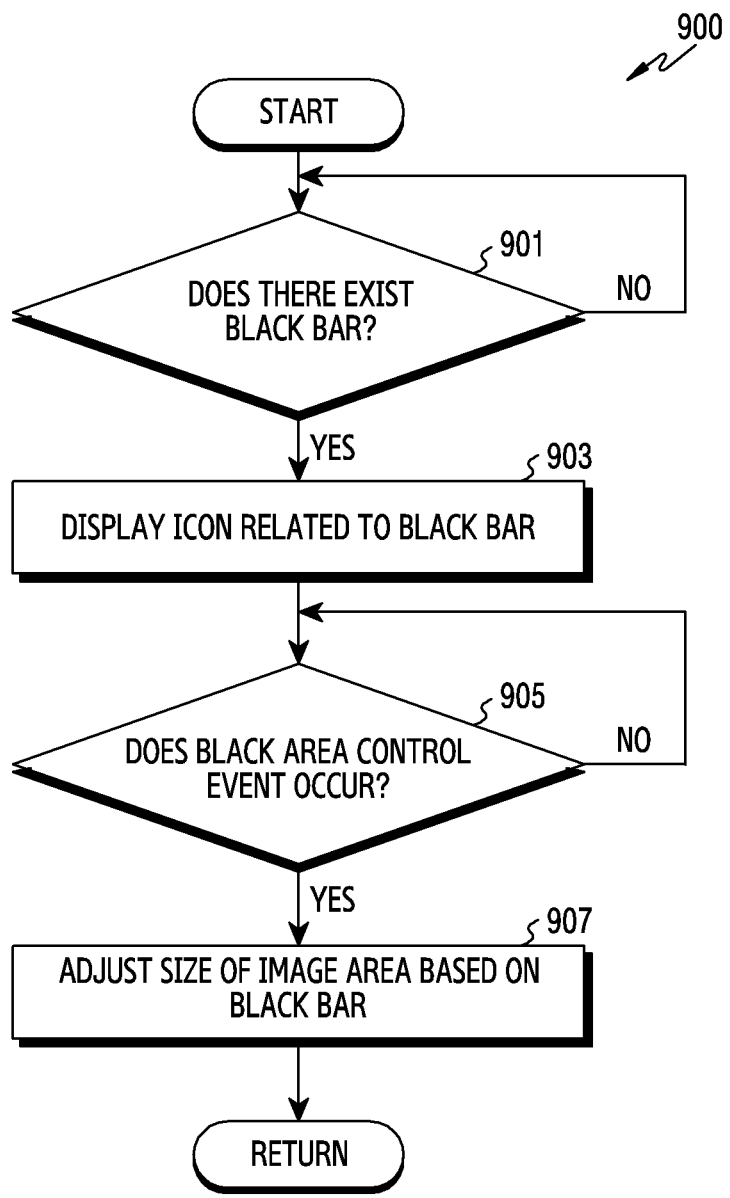
FIG. 9 is a flowchart for outputting black bar information in an electronic device according to various embodiments of the disclosure.
Figure 10:
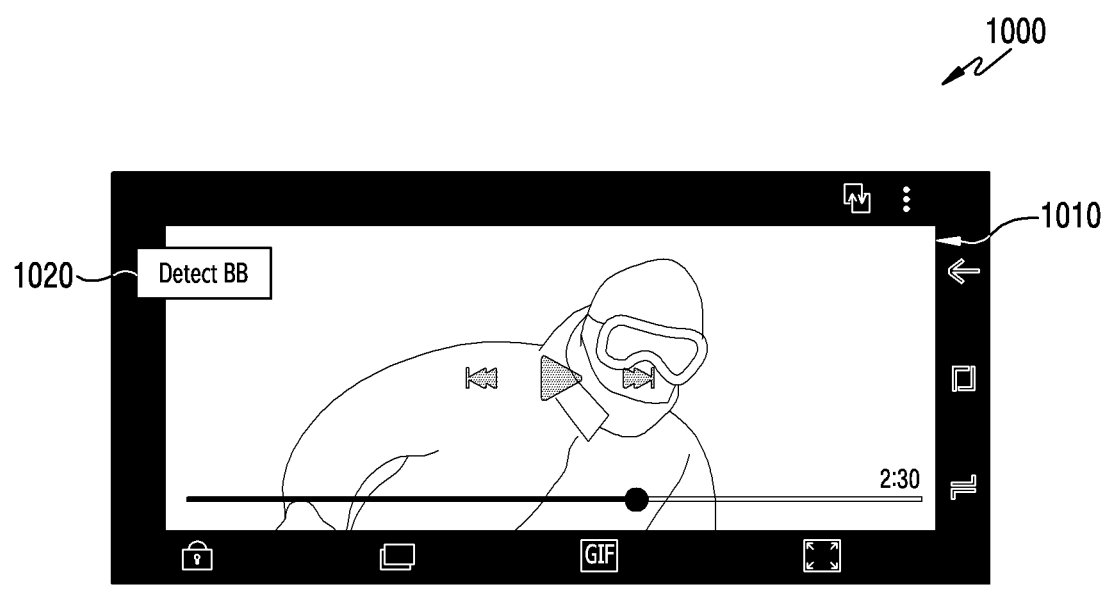
FIG. 10 is a view of a screen for outputting black bar information according to various embodiments of the disclosure.

FIG. 9 is a flowchart 900 for outputting black bar information in an electronic device according to various embodiments of the disclosure. FIG. 10 is a view of a screen 1000 for outputting black bar information according to various embodiments of the disclosure. The following description may be about an operation of adjusting a size of a video content in operation 307. In the following description, the electronic device may include the electronic device 101 of FIG. 1 or at least a portion (for example, the processor 120) of the electronic device 101.

Referring to FIG. 9, in operation 901, the electronic device (for example, the processor 120) may determine whether there exists a black bar included in a video content when the black bar of the video content is detected (for example, operation 305 of FIG. 3).

When there exists the black bar included in the video content ("Yes" in operation 901), the electronic device may display an icon related to the black bar through the display device 160 in operation 903. For example, when there exists the black bar included in the video content, the processor 120 may control the display device 160 to display an icon 1020 related to the black bar on at least a portion of the display device 160 on which the video content 1010 being played is displayed. The processor 120 may indicate that there exists the black bar in the video content, by using the icon related to the black bar.

In operation 905, the electronic device may determine whether an event for controlling the black bar occurs. For example, when a selection input corresponding to the icon 1020 related to the black bar displayed on at least a potion of the display device 160 is received as shown in FIG. 10, the processor 120 may determine that the event for controlling the black bar occurs.

When the event for controlling the black bar occurs ("Yes" in operation 905), the electronic device may adjust a size of an image area included in the video content, based on the black bar detected in the video content, and may output the image area in operation 907. For example, the processor 120 may identify the image area included in the video content, based on a position and a size of the black bar detected in the video content. The processor 120 may render the image area included in the video content to correspond to a size (or a resolution) of the display device 160.

According to various embodiments of the disclosure, an operating method of an electronic device (for example, the electronic device 101) may include: playing a video content based on a request related to playing of the video content; based on the request related to the playing of the video content, acquiring time information related to a detection period of a black bar included in the video content; when the detection period arrives while the video content is being played based on the time information, detecting the black bar by using at least one image frame of the video content included in the detection period; and, based on the black bar included in the video content and a resolution of the display device, adjusting a size of an image area of the video content being played.

According to various embodiments of the disclosure, the time information related to the detection period of the black bar may include a start offset and a duration of the detection period of the black bar.

According to various embodiments, the start offset of the detection period of the black bar may be set based on at least one of an application for playing the video content or a type of another content that is played through the application before the video content.

According to various embodiments, the duration of the detection period of the black bar may be set based on at least one of an application for playing the video content, state information of the electronic device, whether there exists a subtitle file related to the video content, or quality of the video content.

According to various embodiments, detecting the black bar may include: identifying whether the start offset of the detection period arrives while the video content is being played, based on a timer related to the playing of the video content or time stamp information included in an image frame of the video content; and, when the start offset of the detection period arrives, detecting the black bar by using at least one image frame of the video content included in the duration of the detection period.

According to various embodiments, adjusting the size of the image area may include: identifying the image area included in the video content, based on the black bar included in the video content; and, based on the resolution of the display device, rendering the image area of the video content being played.

According to various embodiments, the method may further include: when an aspect ratio of an image frame is changed while the video content is being played, detecting the black bar by using at least one image frame of the video content; and, based on the black bar included in the video content and the resolution of the display device, adjusting the size of the image area of the video content being played.

According to various embodiments, the method may further include: when a channel for receiving a content from an external electronic device is changed while the video content is being played, detecting the black bar by using at least one image frame of the video content included in the detection period; and, based on the black bar included in the video content and the resolution of the display device, adjusting the size of the video area of the video content being played.

According to various embodiments of the disclosure, an operating method of an electronic device (for example, the electronic device 101) may include: playing a video content based on a request related to playing of the video content including an image area and a black bar; based at least on the request, identifying time information related to a period for detecting the black bar included in the video content; when the period corresponding to the time information is played while the video content is being played, detecting the black bar by using at least one image frame included in the period; adjusting a size of the image area from which the black bar is removed, based on the designated resolution; and providing the image area the size of which is adjusted through the display.

According to various embodiments of the disclosure, an operating method of an electronic device (for example, the electronic device 101) may include: playing a video content, based on a request related to playing of the video content including an image area and a black bar; based at least on the request, identifying time information related to a period for detecting the black bar included in the video content; when the period corresponding to the time information is played while the video content is being played, detecting the image area by using at least one image frame included in the period; adjusting a size of the image area based on the designated resolution; and providing the display area the size of which is adjusted through the display.

While various embodiments of the disclosure have been described, various changes can be made without departing from the scope of various embodiments of the disclosure. Therefore, the scope of various embodiments of the disclosure is defined not by the described embodiments but by the appended claims and equivalents to the scope of the claims.

The invention claimed is:

1. An electronic device comprising:
a display;
a processor; and
a memory operatively connected with the processor,
wherein the memory stores instructions that, when executed, cause the processor to:
based on a request related to playing of a video content, play the video content,
obtain time information corresponding to a detection period of a black bar in the video content, wherein the detection period of the black bar is set based on at least one of a remaining capacity of a battery of the electronic device or whether there exists a subtitle file related to the video content, while the video content is being played, detect the black bar using at least one image frame of the video content corresponding to the detection period based on the time information, based on the detection of the black bar, display an icon indicating that the black bar has been detected, based on receiving an user input for the icon, adjust a size of an image area of the video content being played based on the detected black bar in the video content and a resolution of the display, while the video content of which the size of the image area is adjusted is being played, based on detecting a change an aspect ratio of the video content of which the size of the image area is adjusted, re-detect the black bar included in the video content of which the aspect ratio is changed, while re-detecting the black bar, restore the size of the adjusted image area, and re-adjust the size of the image area of the video content based on the re-detected black bar in the video content and the resolution of the display.

2. The electronic device of claim 1, wherein a start offset of the detection period of the black bar is set based on at least one of an application for playing the video content or a type of another content that is played through the application before the video content.

3. The electronic device of claim 2, wherein the instructions cause the processor to:

identify whether the start offset of the detection period arrives while the video content is being played, based on a timer related to the playing of the video content or time stamp information corresponding to an image frame of the video content; and when the start offset of the detection period arrives, detect the black bar using the at least one image frame of the video content corresponding to the detection period.

4. The electronic device of claim 1, wherein the instructions cause the processor to:

identify the image area in the video content, based on the black bar in the video content; and based on the resolution of the display, render the image area of the video content being played.

5. The electronic device of claim 1, wherein the instructions cause the processor to:

when a channel for receiving a content from an external electronic device is changed while the video content is being played, detect the black bar using the at least one image frame of the video content corresponding to the detection period; and based on the black bar in the video content and the resolution of the display, adjust the size of the image area of the video content being played.

6. The electronic device of claim 1, wherein the video content is stored in the memory or is received from an external electronic device.

7. An operating method of an electronic device, the method comprising:

based on a request related to playing of a video content, playing the video content;

obtaining time information corresponding to a detection period of a black bar in the video content, wherein the detection period of the black bar is set based on at least one of a remaining capacity of a battery of the electronic device or whether there exists a subtitle file related to the video content;

while the video content is being played, detecting the black bar using at least one image frame of the video content corresponding to the detection period based on the time information;

based on the detection of the black bar, displaying an icon indicating that the black bar has been detected;

based on receiving an user input for the icon, adjusting a size of an image area of the video content being played based on the detected black bar in the video content and a resolution of a display of the electronic device;

while the video content of which the size of the image area is adjusted is being played, based on detecting a change an aspect ratio of the video content of which the size of the image area is adjusted, re-detecting the black bar included in the video content of which the aspect ratio is changed;

while re-detecting the black bar, restoring the size of the adjusted image area; and re-adjusting the size of the image area of the video content based on the re-detected black bar in the video content and the resolution of the display.

8. The method of claim 7, wherein a start offset of the detection period of the black bar is set based on at least one of an application for playing the video content or a type of another content that is played through the application before the video content.

9. The method of claim 7, wherein adjusting the size of the image area of the video content being played comprises:

identifying the image area in the video content, based on the black bar in the video content; and based on the resolution of the display, rendering the image area of the video content being played.

10. The method of claim 7, further comprising:

when a channel for receiving a content from an external electronic device is changed while the video content is being played, detecting the black bar using the at least one image frame of the video content corresponding to the detection period; and based on the black bar in the video content and the resolution of the display, adjusting the size of the image area of the video content being played.

* * * * *